April 9, 1940.                    W. F. RIDGWAY                    2,196,231
                              INDICATING MECHANISM
                              Filed July 23, 1937                3 Sheets-Sheet 2
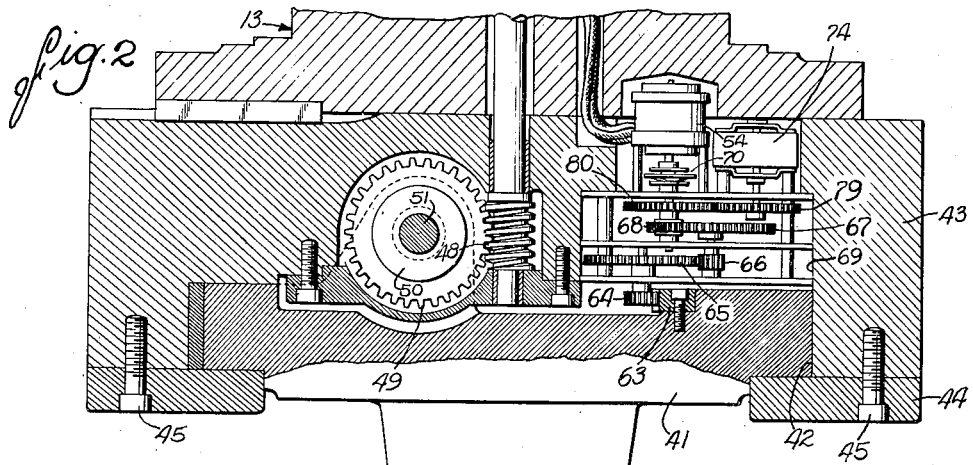
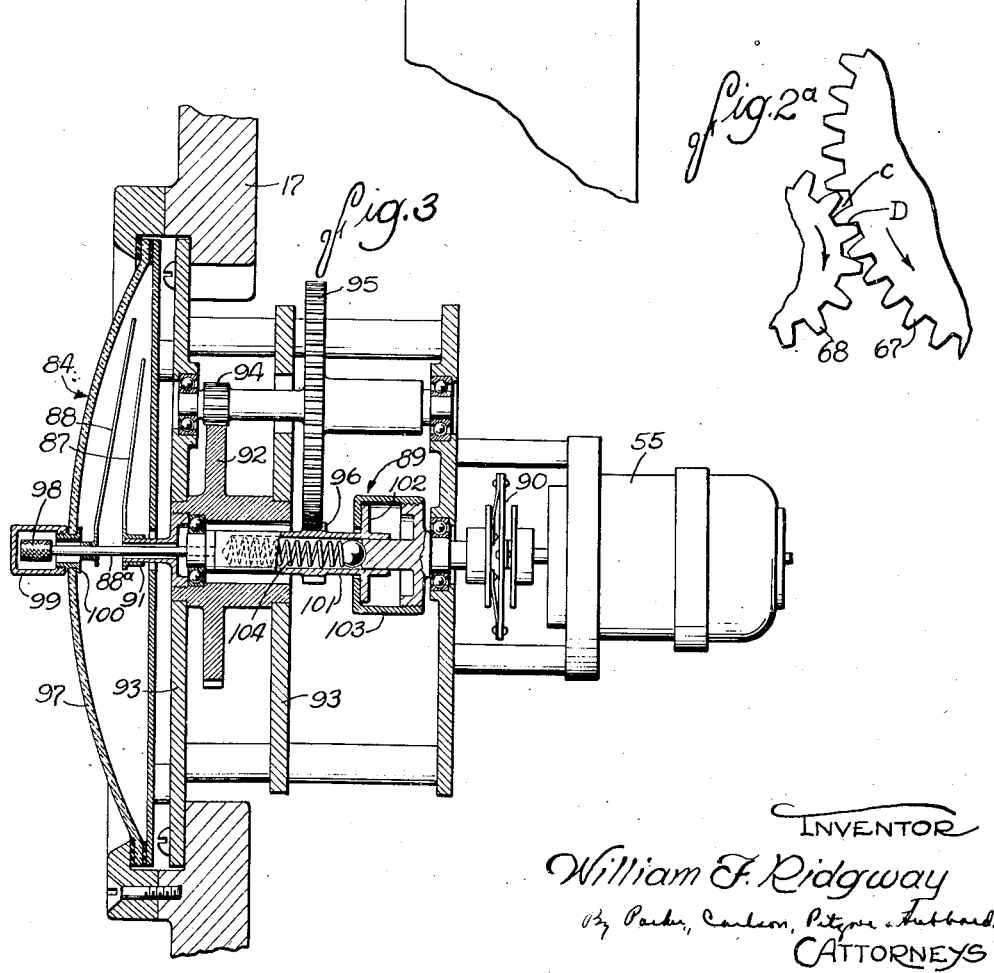
INVENTOR
William F. Ridgway
By Parker, Carlson, Pitzner & Hubbard
ATTORNEYS April 9, 1940.  W. F. RIDGWAY  2,196,231
INDICATING MECHANISM
Filed July 23, 1937   3 Sheets-Sheet 3

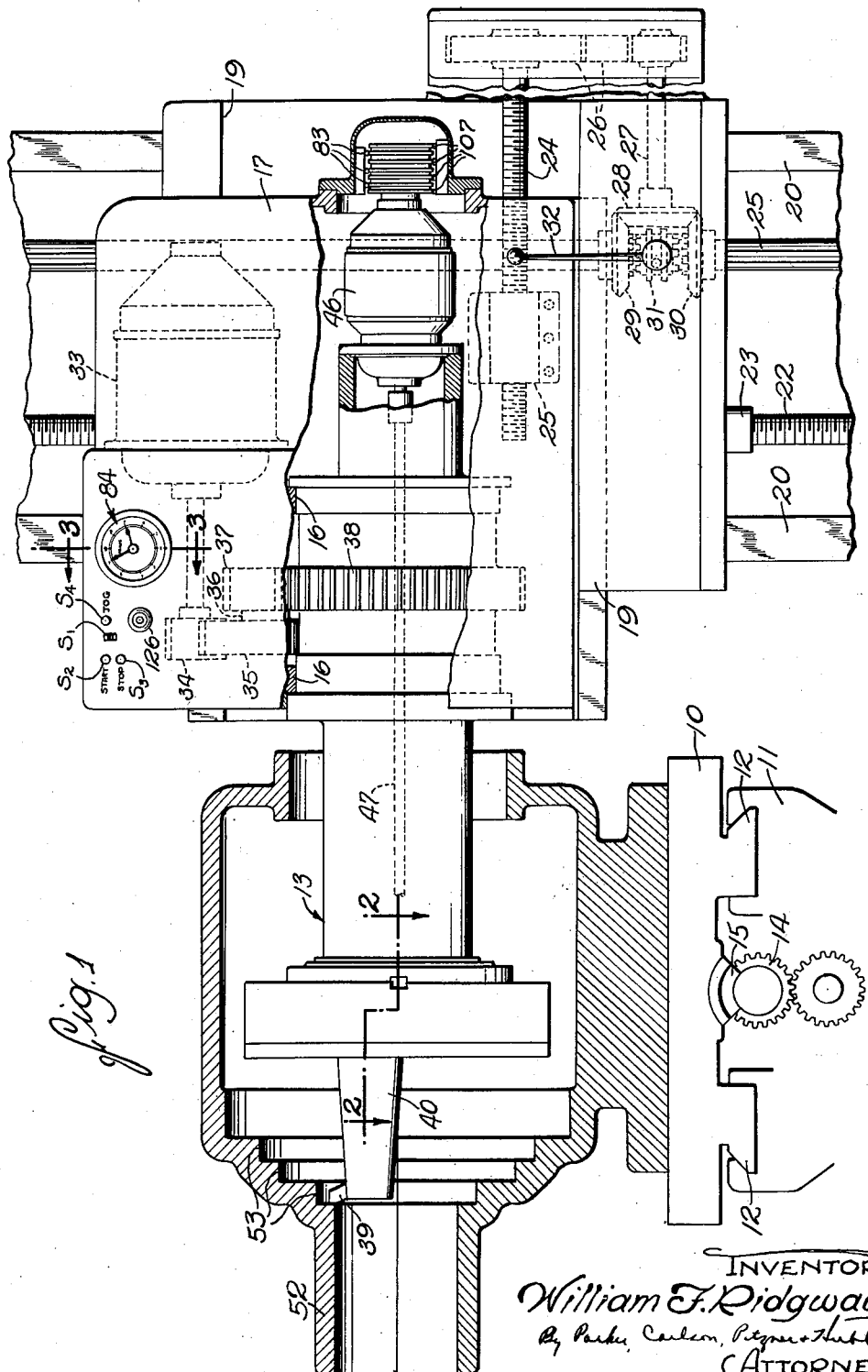

INVENTOR
William F. Ridgway
By Parker, Carlson, Pitzner & Hubbard.
ATTORNEYS

Patented Apr. 9, 1940

2,196,231

UNITED STATES PATENT OFFICE 2,196,231

INDICATING MECHANISM

William F. Ridgway, Rockford, Ill., assignor to The Ingersoll Milling Machine Company, Rockford, Ill., a corporation of Illinois Application July 23, 1937, Serial No. 155,209

3 Claims. (Cl. 74—409)

The invention relates to mechanisms for measuring or indicating changes in the position of a movable machine element such as a work table, a tool head, or the like.

One object of the invention is to provide in an indicating mechanism of the above general character a novel means by which backlash or looseness in the motion transmitting connection between the machine element and the indicator proper may be taken up continuously.

Other objects and advantages of the invention will become apparent from the following detailed description taken in connection with the accompanying drawings, in which Figure 1 is a partial end elevation of a machine tool provided with an indicator mechanism embodying the invention, portions of the tool head assembly being broken away in order better to illustrate the interior construction thereof.

Fig. 2 is an enlarged detail transverse sectional view along the line 2—2 in Fig. 1 illustrating particularly the construction of the indicator transmitter mechanism.

Fig. 2ª is an enlarged detail view of a portion of the gear train included in the mechanism of Fig. 2.

Fig. 3 is an enlarged detail vertical sectional view along the line 3—3 in Fig. 1 illustrating particularly the construction of the indicator receiver mechanism.

Figure 4:
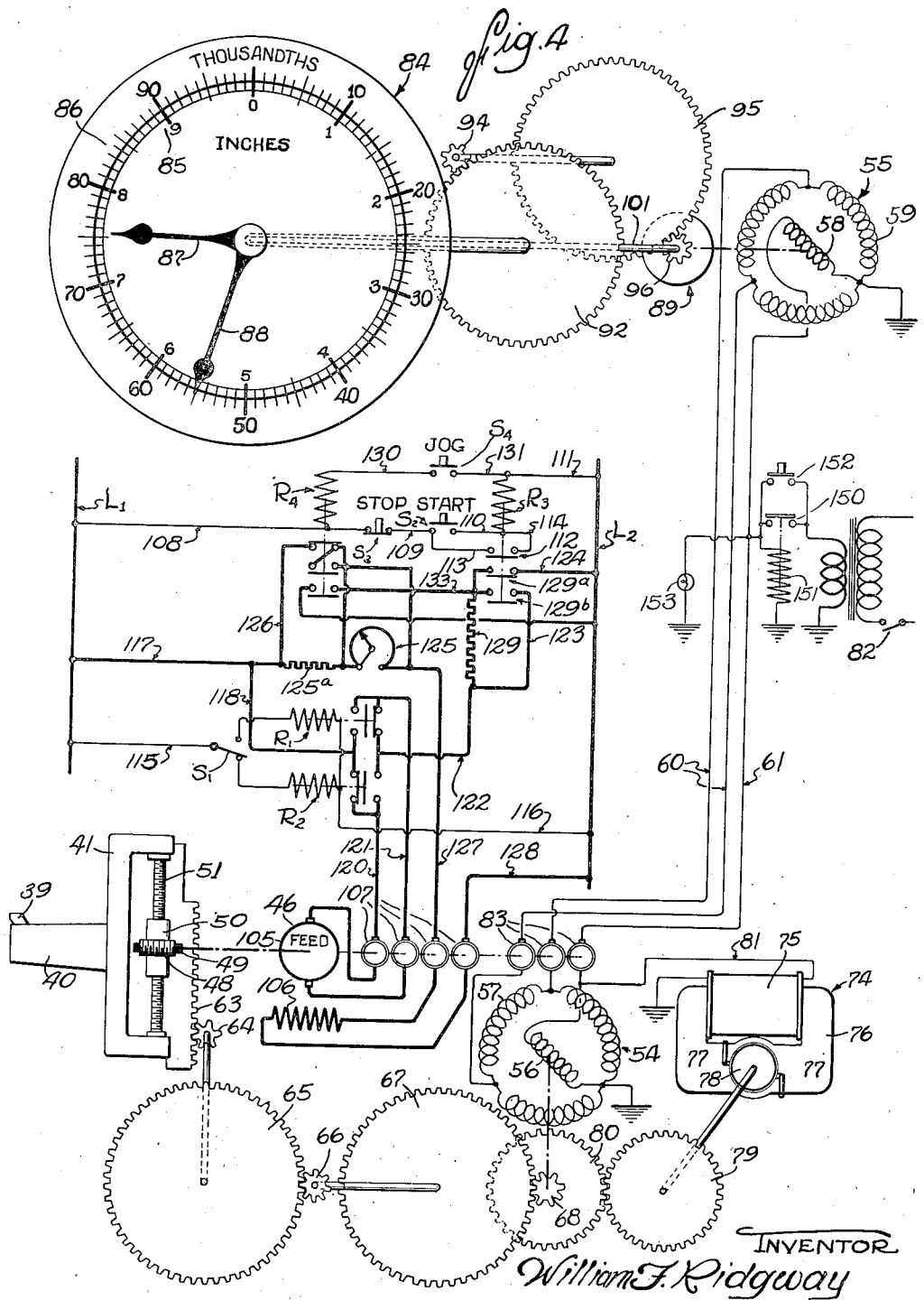
Fig. 4 is a schematic representation of the indicator mechanism as well as of the associated machine tool elements and control circuits therefor.

For purposes of illustration and exemplification of its various novel features, the invention has been shown herein as embodied in an indicating mechanism applied to an open-side boring and milling machine. It will be understood by those skilled in the art, however, that the invention is also applicable to a wide variety of other types of machine tools, and the appended claims are intended to cover all modifications and alternative constructions within the spirit and scope of the invention.

The boring and milling machine shown includes a work table 10 mounted on ways 12 for horizontal reciprocatory movement on a bed 11 and a rotatable tool supporting ram designated generally by the numeral 13. Traversing movement is imparted to the table 10 by a suitable power actuating mechanism (not shown) connected thereto through a gear 14 meshing with a rack 15 fast on the table.

The position of the ram 13 with reference to the work supporting table 10 may be adjusted both horizontally and vertically. To this end, the ram is journaled within suitable bearings 16 provided on the outer face of a carriage or tool head assembly 17 which is in turn arranged for horizontal traversing movement on a saddle 18 by means of a pair of spaced horizontal dovetail guideways 19. The saddle 18 is arranged for vertical traversing movement on suitable guides 20 secured to a transverse face of a vertical fixed column 21.

Vertical traversing movement is imparted to the saddle 18 through the medium of a screw 22 threaded in a nut 23 fast on the saddle and operatively connected to a driving motor or the like. Similarly, horizontal traversing movement is imparted to the horizontally reciprocable carriage 17 through the medium of a screw 24 threaded in a traveling nut 25 fast on the carriage. For this purpose, rotation is imparted to the screw 24 from a power driven vertical spline shaft 25ª through a set of meshing gears 26 and a take-off shaft 27. This latter shaft is provided with a bevel gear 28 which meshes with a pair of complemental bevel gears 29 and 30 loosely journaled on the spline shaft 25. These latter bevel gears are alternatively connected in driven relation with the spline shaft by an axially slidable clutch collar 31 having a spline connection with the shaft 25 and provided with projections on its opposite end faces adapted to mesh with complemental projections on the adjacent ends of the bevel gears 29 and 30. The clutch collar 31 may be shifted from its neutral position illustrated into engagement with either of the bevel gears by means of a manual operating lever 32. By this clutch arrangement the operator is thus enabled to readily connect the lead screw 24 to the drive shaft 25 for traversing the carriage 17 toward or away from the work supporting table 10.

The unitary power actuating mechanism for the ram or tool spindle 13 is also mounted on the carriage 17. This mechanism includes an electric driving motor 33 having a pinion 34 thereon which meshes with a gear 35 fast on a jackshaft 36. A pinion 37 also fast on the shaft 36 meshes with a gear 38 fixed on the periphery of the rotatable ram 13.

An adjustable support has been provided for a metal removing tool 39 on the outer end of the ram 13 whereby this tool may be moved progressively in a radial direction toward and away from the axis of the ram in order to perform either boring or face milling operations as desired. To this end, the tool 39 is secured to the outer end of an arm 40 projecting from the front face of a tool supporting block 41 (Fig. 2) which is slidable bodily along a diametrically disposed groove 42 fashioned in the front face of a circular head 43. The latter is carried on the outer end of the spindle or ram 13. A face plate 44 secured to the head 43 by cap screws 45 serves to hold the block 41 in position in the groove 42.

Traversing or adjusting movement is imparted to the tool 39 and its supporting block 41 by means of a power actuating mechanism illustrated as including an electric driving motor 46 (Fig. 1). This driving motor is mounted at the inner end of the ram 13 and is rotatable bodily therewith. The connection between the tool supporting block 41 and motor 46 is effected by an elongated shaft 47 coaxial with the ram 13 and having a worm 48 (Fig. 2) fast on its outer end and meshing with a worm wheel 49. This worm wheel is fast on a nut 50 which is in turn threaded on a lead screw 51 fixed to the inner side of the tool supporting block 41 (see Fig. 4). It will thus be seen that the reversible feed motor 46 may be utilized either to traverse the tool 39 across the face of a work piece or to position the same at any selected distance from the axis of rotation of the ram 13.

The novel indicating mechanism herein contemplated has been shown as arranged to indicate the radial position of the tool 39. The use of such an indicator is particularly advantageous in machine tools of the type described since the metal removing tool may be disposed within the interior of a work piece such as the hollow casting 52 (Fig. 1) and by virtue of the indicating mechanism it is possible to position the tool accurately for boring stepped recesses such as the recesses 53 without frequent withdrawals of the tool to locate the latter for each operation. In general, the indicating mechanism shown includes a transmitter, operatively connected to the tool support 41 and movable bodily with the ram, together with a receiver which is located at some remote point easily accessible to the operator and connected to a suitable visual indicator. Preferably, this indicator gives a continuous indication of the tool or tool support position. No claim is made herein to that part of the disclosed system which involves the electrical transmission of the motion to be measured and indicated at a remote point, such part forming the subject matter of my copending divisional application Serial No. 301,882, filed October 30, 1939.

In the particular construction illustrated, the transmitter and receiver have been illustrated as self-synchronous electrical devices 54 and 55 respectively (Fig. 4). Each of these devices embodies relatively rotatable inductively related primary and secondary members 56—57 and 58—59, respectively. The secondary members 57 and 59 are preferably stationary and include distributed electrical windings having corresponding symmetrical polyphase terminals interconnected through a pair of conductors 60 and through a ground connection such as the machine tool structure. The rotatable primary members 56 and 58 are on the other hand provided with single-phase windings defining two definite poles and connected through a conductor 61 and a suitable ground connection to a common source of single-phase alternating current such as a transformer 62.

With such an arrangement the primary members 56 and 58 of the transmitter and receiver are self-synchronizing. That is, when the primary member 56 of the transmitter is rotated, the primary member 58 of the receiver will be moved through a corresponding degree of angular adjustment in synchronism with the transmitter. The reason for this self-synchronous action is that the single-phase current in the transmitter primary 56 induces voltages in the three sections of the distributed primary winding 57 of the transmitter. These three voltages are not equal in magnitude and vary with the position of the rotor. When the transmitter and receiver rotors are in exactly corresponding positions, the voltages induced in the transmitter secondary winding 57 are exactly equal and opposite to those induced in the receiver secondary winding 59. In other words, they are balanced so that no current flows in the secondary windings. When the transmitter rotor is moved from its original position, however, the induced voltages are no longer equal and opposite and a current flows in the secondary windings. This current flow sets up a torque which tends to return the rotors to the synchronous position. Since the transmitter rotor is positively moved and held in position by its connection to some external member, the receiver rotor shifts to a position corresponding to the new position of the transmitter rotor. When the receiver rotor attains the new position, the secondary currents are again balanced so that no further torque is exerted on the rotors. Thus, whenever the transmitter rotor is moved, the receiver rotor immediately assumes a similar position.

In order to facilitate a readily discernible indication of small movements of the tool support 41, an arrangement has been provided for shifting the transmitter rotor 56 through comparatively large angles of adjustment for small increments of movement of the tool support. For this purpose, a speed-increasing gear train is interposed between the tool support and transmitter rotor. Thus, as shown in Fig. 4, a rack 63 fixed to the tool support 41 meshes with a pinion 64 fast with a larger gear 65. This latter gear in turn meshes with a pinion 66 fast on a larger gear 67 meshing with a pinion 68 on the transmitter rotor shaft. This gear train is mounted within a suitable recess 69 formed in the ramhead 43 (Fig. 2). It will be noted that the transmitter rotor 56 is connected to the pinion 68 through a flexible coupling 70 in order to minimize friction in the gear train which would otherwise result from any misalinement of the shafts.

With such a gear train connection between the machine tool element and the associated indicator transmitter, backlash in the gear train may cause inaccuracy in the operation of the indicator. A simple and effective arrangement has been provided, however, in order to overcome this difficulty. For that purpose, an electric motor, illustrated as a small shaded pole induction motor 74 (Fig. 4), is arranged to exert a unidirectional force or torque on the terminal gear of the train, which force is sufficient to take up any backlash or looseness in the motion-transmitting connection between the machine tool element and the indicator control member 56, but which is also insufficient to move the tool support 41. Thus, even though the gears and pinions of the gear train are not formed with a high degree of precision, the backlash take-up motor 74 effectively prevents relative movement therebetween.

The backlash take-up motor 74 illustrated includes an energizing winding 75 surrounding a core 76 and cooperating with shading rings 77 to induce rotation of an induction-type rotor 78 and produce a substantially constant torque in all positions of the motor shaft. The construction of such a motor is well understood and is not believed to require further detail. A gear 79 on the motor rotor shaft meshes with a gear 80 of the train fast on the shaft of the pinion 68 and interposed between this pinion and the flexible connection 70. This connection of the motor 74 to the last element of the gear train renders it effective to take up the backlash in all of the gears and pinions of the train.

In general, the motor 74 serves to exert a unidirectional torque on the gear train in such manner that backlash is effectively prevented for either direction of rotation of the gear train. For example, if the rack 63 (Fig. 4) is moved downward, upon an adjustment of the tool support 41 radially outward from the ram axis, pinion 68 on the transmitter shaft will be rotated clockwise and the meshing gear 67 rotated counter-clockwise. In such case, the lower faces of the teeth on the gear 67 would normally contact the upper faces of the teeth on the pinion 68 in driving relation (as indicated at D in Fig. 2ª) and any clearance would occur at the opposite sides of the teeth (as indicated at C in Fig. 2ª). Now if the motor 74 is arranged to exert a torque on pinion 68 tending to rotate it counter-clockwise, the desired initial contact is had between the gear teeth at D so that no play or relative movement occurs when they begin to rotate upon upward shifting of the rack 63. Any backlash between the other gears of the train is taken up in the same manner.

In the event that the rack 63 is moved upward (as viewed in Fig. 4), the gear train is driven in the opposite direction. The motor 74 is, however, effective to prevent backlash in this opposite direction of rotation also. Thus, when the gear 67 is rotated clockwise, contact is still maintained between its teeth with the teeth of the pinion 68 at D due to the torque of the motor 74 which still tends to rotate the pinion 68 in a counter-clockwise direction. In effect, the gear 67 no longer drives the pinion 68 but merely moves out of obstructing engagement with successive teeth on the pinion, thereby determining the speed at which the pinion is rotated by the motor 74. The same result obtains between the teeth of the other gears throughout the train. In view of this action, it will be apparent that the motor 74 must have torque sufficient to rotate the gear train and transmitter rotor but must still be incapable of moving the tool support 41. The worm and gear connection between the tool support 41 and its feed motor 46 imposes a load which is sufficiently great so that the motor 74 may be designed to have a torque amply great to move the connected gear train and transmitter rotor without danger of its being so great as to move the tool support. The speed of the parts of the gear train connected to the motor 74 must never exceed the maximum possible speed of the motor so that it can always perform its required driving function.

It will thus be seen that the motor 74 is fully effective to prevent backlash in the gear train for either direction of rotation of the gears. Furthermore, the backlash motor remains effective in performing this function irrespective of the extent of rotation. In other words, if the indicator mechanism is connected to a machine tool element having an extremely long range of movement, the backlash take-up mechanism will remain equally effective throughout this range, as distinguished from a hairspring or hydraulic piston backlash take-up arrangement, for example, in which the range of movement is relatively limited. In addition, it will be seen that continued use will not affect the operation of the backlash take-up device since there are no frictionally engaging parts to become worn or spring biasing mechanisms which require readjustment after fatigue due to extended use.

Energy is preferably supplied to the backlash take-up motor 74 from the same source of single-phase alternating current as the primary members 56 and 58 of the transmitter and receiver elements of the indicator mechanism. Thus, one terminal of the motor energizing winding 75 is connected to the secondary of the transformer 62 through conductors 81 and 61 while the other terminal of the winding is connected to the ground as, for example, through the machine tool structure. This arrangement of connections makes it possible to deenergize the motor 74 as well as the electrical transmitter and receiver by means of a single control switch 82 and as a result, the operator cannot neglect to shut-off the stalled motor 74 when cutting out the indicator mechanism. In addition, the arrangement of connections described simplifies the problem of providing electrical connections between the elements carried by the rotatable ram 13 and the relatively movable carriage 17. For this latter purpose, three slip rings 83 (Figs. 1 and 4) coaxial with the ram 13 and mounted on the inner end thereof complete the connections for conductors 60 and 61. Since the winding 75 of motor 74 is energized through the conductor 61, no separate slip ring or slip rings are required for this motor and the use of the ground connections described also eliminates the necessity of two additional slip rings for the electrical indicator system terminals.

The receiver 55 is operatively connected to a suitable visual indicator designated generally by the numeral 84. As shown, this indicator preferably embodies a pair of concentric scales 85 and 86 graduated respectively in terms of inches and thousandths of an inch, together with corresponding indicator needles 87 and 88 (Figs. 3 and 4). This visual indicator is mounted at some point convenient to the operator as, for example, on the carriage 17 (Fig. 1). Upon reference to Fig. 3, it will be seen that the needle or pointer 88 rotates at the same speed as the rotor of the receiver 55, being mounted on a shaft 88ª connected thereto through a clutch, designated generally by the numeral 89, and a flexible connection 90. A suitable speed reduction gearing is interposed between the inch-indicating pointer 87 and the receiver rotor. Thus, the needle 87 is secured to a sleeve 91 surrounding the shaft 88ª in spaced relation and threaded in a bore formed in the outer end of a hub of a gear 92 journaled in suitable supporting plates 93. This gear in turn meshes with a pinion 94 fast with respect to a gear 95 meshing with a second pinion 96. The latter pinion is fast on the driven member of the clutch 89.

Ready readjustment of the zero setting for the indicator pointers 87 and 88 is effected through the medium of the clutch 89. For this purpose, the shaft 88ª is extended through an aperture in a transparent bezel 97 which covers the indicator and a manual operating knob 98 is attached to its outer end. A cap 99 threaded on a bushing 100 serves to protect the operating knob from accidental contact. When the shaft 88ª is shifted axially inward by the operator a corresponding movement is effected of a tubular sleeve 101, which constitutes the driven member of the clutch 89. It will be seen that this sleeve is provided with a laterally projecting annular flange 102 frictionally engageable with the adjacent bottom wall of a cup-shaped member 103 fast on the shaft of the receiver 55. A helical spring 104 disposed within the sleeve 101 normally maintains the driving and driven members of the clutch in frictional engagement. After the clutch has been disengaged as described, the shaft 88ª is rotated, thereby directly moving the pointer 88 and correspondingly moving the pointer 87 through the associated gear train 92—94—95—96.

When the transmitting and receiving motors 54 and 55 are deenergized simultaneously, they are apt to fall out of step and synchronism between them will not ordinarily be restored automatically upon restoration of the current supply. It is preferred, therefore, to provide means for indicating failure of the current supply. To this end, energization of the motors 54 and 55 is controlled by a switch 150 interposed in one of the current supply conductors and closed when a relay 151 is energized. Such energization is effected initially by closure of a manually operable switch 152 and is maintained by a sealing circuit for the relay controlled by the switch 150. Interposed in parallel with the motors 54 and 55 is an indicator lamp 153 which remains lighted during normal operation. In the event of a voltage failure, the relay 151 and the lamp will become deenergized thereby indicating the necessity of manually reestablishing synchronism between the motors 54 and 55.

The machine tool preferably embodies an arrangement for quickly and accurately controlling the operation of the tool feed motor 46 (Fig. 4) so that the advantages of a continuous indication of the tool position may be fully utilized by the operator. In the preferred construction illustrated the motor 46 includes an armature 105 and a field 106 energized from supply lines $L_1$ and $L_2$, being connected thereto through a series of slip rings 107 coaxial with the ram 13. The control mechanism for the feed motor is arranged to energize the same for rotation in either direction at a normal feed speed and alternatively, to cause the feed motor to move at a lower speed under the control of a hold-down jog switch. To this end, the control arrangement embodies a pair of directional control relays $R_1$ and $R_2$ controlled by a manually operable single-pole double-throw selector switch $S_1$. In addition, a run relay $R_3$ and jog relay $R_4$ are controlled respectively by "stop" and "start" push button switches $S_2$ and $S_3$ and a push button "jog" switch $S_4$. Upon a momentary closure of the normally open push button start switch $S_2$, the run relay $R_3$ is energized (through a circuit $L_1$—108—$S_3$—109—$S_2$—110—$R_3$—111—$L_2$), this relay being maintained closed by the resultant closure of its sealing contacts 112, connected in shunt relation with the starting push button $S_2$ by conductors 113 and 114. The energization of the run relay $R_3$ in turn connects the motor armature 105 for rotation in a pre-selected direction determined by the selector switch $S_1$. The circuit is first completed through a starting resistance 129 upon closure of contacts 129ª and then this resistance is shunted out by contacts 129ᵇ when relay $R_3$ is fully closed. When the switch $S_1$ is in the position shown in Fig. 4, its associated direction relay $R_2$ is energized (through a circuit $L_1$—115—$S_1$—$R_2$—160) to thereby connect the motor 105 (through a circuit $L_1$—117—118—$R_4$—119—$R_2$—120—105—121—$R_1$—122—123—$R_3$—124—$L_2$) for rotation in the selected direction. Similarly, when the direction selector switch $S_1$ is closed to energize its associated relay $R_1$ (through a circuit $L_1$—115—$S_1$—$R_1$—116—$L_2$)

the armature is connected, upon energization of the run relay $R_3$, for rotation in the opposite direction (through a circuit $L_1$—117—118—$R_1$—121—105—120—$R_2$—122—123—$R_3$—124—$L_2$). The current supplied to the motor field 106 and consequently the speed of the motor is normally controlled by a variable rheostat 125 interposed in its energizing circuit ($L_1$—117—126—$R_4$—126ª—125—127—106—128—$L_2$). A pair of normally closed contacts of the jog relay $R_4$ thus maintain a shunt about a resistor 125ª. It will be seen that the feed motor 46 is completely energized for rotation in a selected direction by a momentary closure of the start switch $S_2$, the speed of rotation being determined by the setting of the manually adjustable field rheostat 126. The motor may be stopped by momentarily opening the normally closed stop switch $S_3$, thereby breaking the sealing circuit of the run relay $R_3$.

Closure of the jog switch $S_4$, which is biased to its open position, serves to energize the feed motor 46 for rotation in a direction selected by the switch $S_1$ but at the same time, substitutes the fixed resistor 125ª for the rheostat 125 in the field circuit and inserts a resistor 129 in the armature circuit so that the speed of the motor is reduced to a fixed low value. Thus, closure of the jog switch $S_4$ energizes the jog relay $R_4$ (through a circuit $L_1$—108—$R_4$—130—$S_4$—131—$L_2$)

which in turn completes a shunt circuit about the field rheostat 125 (through conductors 126ª and 132) and at the same time connects the motor armature for rotation in one direction if the relay $R_2$ is closed (through a circuit $L_1$—117—118—$R_2$—120—105—121—122—129—133—$R_4$—134—$L_2$) and for rotation in the opposite direction if relay $R_1$ is closed (through a circuit $L_1$—117—118—$R_1$—121—105—120—122—129—133—$R_4$—134—$L_2$). Since there is no sealing circuit for the jog relay, it remains energized while jog switch $S_4$ is closed.

In the operation of the machine tool described, a work piece such as the hollow casting 52 (Fig. 1) is clamped on the work table 10 and the table is advanced to bring the work piece into alinement with the tool support. The ram 13 is then elevated as required by the saddle 18 and projected by advancing the carriage 17 to bring the cutting tool 39 into operative relation with the work piece. In the event that a series of stepped circular recesses, such as the recesses 53, are to be bored, the rotating cutting tool 39 is first located at the axis of rotation and then fed outwardly by the feed motor 46 in the usual manner to effect the desired boring or face milling operation. In order to increase the ease of manipulation and control of the machine, the switches S₁, S₂, S₃, S₄, and control member for rheostat 125 are preferably positioned adjacent the visual indicator 84 as, for example, on the carriage 17 (Fig. 1). The operator is thus able to gauge the progress of the work by means of the visual indicator and to control the location of the cutting tool with great nicety.

When the indicating mechanism is to be used directly for measuring the movements of the machine tool element, the parts of the motion transmitting connection between the machine tool element and the indicator control member 56 must be constructed with sufficient precision to follow the movements of the element with the accuracy desired. The necessity for constructing the parts with extreme precision may be avoided where the mechanism is used merely to indicate a series of different tool settings in the machining of a series of duplicate work pieces such as those illustrated. In such a case, the parts of the motion transmitting connection would be constructed with ordinary precision only and, with the aid of measuring gauges, the mechanism calibrated for the different tool settings desired by noting the readings of the indicator 84 for each different tool setting. Then, in machining duplicate work pieces 52 illustrated, the tool would be positioned for machining the different bores 53 by duplicating on the visual indicator the readings obtained in the calibration of the mechanism to adapt it for the particular work pieces.

I claim as my invention:

1. The combination of a power actuated element, a movable member, a motion transmitting connection for actuating said member in accordance with changes in the position of said element including a gear train, a normally energized rotary electric motor, and means providing a driving connection between the motor shaft and the terminal gear of said train remote from said element, said motor applying a unidirectional torque of a magnitude sufficient to take up looseness in said first mentioned connection but insufficient to move said element.

2. The combination of an actuating element, a movable member, a mechanical driving connection for actuating said member in accordance with changes in the position of said element, and a normally energized rotary electric motor connected to a terminal part of said driving connection and exerting thereon a unidirectional force of a magnitude sufficient to take up looseness in said driving connection but insufficient to move said element.

3. The combination of an actuating element, a movable member, a plural gear train for connecting said member in driven relation with respect to said element, and means including an electric motor operatively connected to said gear train for exerting a unidirectional torque thereon sufficient to prevent backlash in said gear train but insufficient to move said element.

WILLIAM F. RIDGWAY.